(12) United States Patent
Rojals

(10) Patent No.: US 12,513,343 B2
(45) Date of Patent: Dec. 30, 2025

(54) DEBANDING SYSTEMS AND METHODS

(71) Applicant: Netflix, Inc., Los Gatos, CA (US)

(72) Inventor: Joel Sole Rojals, San Diego, CA (US)

(73) Assignee: Netflix, Inc., Los Gatos, CA (US)

( * ) Notice: Subject to any disclaimer, the term of this patent is extended or adjusted under 35 U.S.C. 154(b) by 190 days.

(21) Appl. No.: 18/441,725

(22) Filed: Feb. 14, 2024

(65) Prior Publication Data

US 2024/0388739 A1 Nov. 21, 2024

Related U.S. Application Data

(60) Provisional application No. 63/502,900, filed on May 17, 2023.

(51) Int. Cl.
  *H04N 19/86* (2014.01)
  *H04N 19/167* (2014.01)
  *H04N 19/182* (2014.01)

(52) U.S. Cl.
  CPC .......... *H04N 19/86* (2014.11); *H04N 19/167* (2014.11); *H04N 19/182* (2014.11)

(58) Field of Classification Search
  CPC ..................................................... H04N 19/86
  USPC ..................................................... 375/240.29
  See application file for complete search history.

(56) References Cited

U.S. PATENT DOCUMENTS

2010/0046804 A1* 2/2010 Gu .................... H04N 19/86
382/190
2010/0246689 A1 9/2010 Filippini
2013/0301704 A1* 11/2013 Srinivasan .......... H04N 19/895
375/240.02
2023/0388556 A1 11/2023 Sole Rojals

FOREIGN PATENT DOCUMENTS

CN         101583970 B    7/2012
WO     2023235730 A1    12/2023

OTHER PUBLICATIONS

Bhagavathy, S. et al., "Multiscale Probabilistic Dithering for Suppressing Contour Artifacts in Digital Images", Sep. 2009, IEEE Transactions on Image Processing, vol. 18, No. 9, pp. 1936-1945; 10 pages.

(Continued)

*Primary Examiner* — Yulin Sun
(74) *Attorney, Agent, or Firm* — Greenberg Traurig, LLP

(57) ABSTRACT

A computer-implemented method includes accessing a video frame that includes multiple pixels. The method also includes computing a local distribution for a specified region of the video frame that includes various pixels that are likely to include banding artifacts. This computing includes: defining a probability range for the local distribution that lies within a predefined interval, generating, using the defined probability range, a cumulative vector that includes a distribution of pixels values along a cumulative range of pixels that lie within the specified region of the video frame, and selecting a pseudorandom value within the cumulative range. The method further includes applying dithering at least to the specified region of the video frame using the selected pseudorandom values within the cumulative range. Various other methods, systems, and computer-readable media are also disclosed.

20 Claims, 9 Drawing Sheets

(56) References Cited

OTHER PUBLICATIONS

Huang, Q. et al., "Understanding and Removal of False Contour in HEVC Compressed Images", Feb. 2018, IEEE Transactions on Circuits and Systems for Video Technology, vol. 28, No. 2, pp. 378-391; 14 pages.

International Search Report and Written Opinion for International Application No. PCT/US2024/027218, mailed Jul. 9, 2024; 14 pages.

Tandon, P. et al., "CAMBI: Contrast-aware Multiscale Banding Index", 2021; 5 pages.

\* cited by examiner

DEBANDING SYSTEMS AND METHODS

CROSS REFERENCE TO RELATED APPLICATION

This application claims priority to and the benefit of U.S. Provisional Application No. 63/502,900, filed May 17, 2023, entitled "Debanding Systems and Methods," the disclosure of which is incorporated, in its entirety, by this reference.

BACKGROUND

Internet video streaming has become commonplace across the world. Users implement electronic devices to request and view all types of videos from a variety of different streaming sources. Each of these videos is composed of long strings of video frames. Each video frame is prepared for transmission and is transmitted over the internet to the user's electronic device. As part of this preparation process, the video frames typically undergo compression, encoding, decoding, and other processes. During these processes, the video frames often pick up unwanted visual artifacts. One such artifact is banding.

Banding artifacts are staircase-like contours that are often introduced during the processing of smooth, slightly varying colors or shades. The noticeability of these contours may be exacerbated during the encoding process. Such banding artifacts are often visible in large and smooth regions, typically having small gradients from one color or shade to another. The banding artifacts are often noticeable to users, in part due to the tendency of electronic displays to enhance sharp gradients. Banding artifacts also tend to have noise in the smooth regions of the bands. This can make the detection and removal of the banding artifacts very difficult.

SUMMARY

As will be described in greater detail below, the present disclosure generally describes systems and methods for detecting and removing banding artifacts from video frames. These video frames are often included in video streams that are transmitted over the internet to electronic displays for presentation to users.

In one example, a computer-implemented method for detecting and removing banding in video frames includes accessing a video frame that includes multiple pixels. The method next includes computing a local distribution for a specified region of the video frame that has certain pixels that are likely to include banding artifacts. This computing process includes defining a probability range for the local distribution that lies within a predefined interval, generating a cumulative vector, using the defined probability range, that includes a distribution of pixels values along a cumulative range of pixels that lie within the specified region of the video frame, and selecting a pseudorandom value within the cumulative range. The method also includes applying dithering at least to the specified region of the video frame using the selected pseudorandom values that lie within the cumulative range.

In some embodiments, the pseudorandom value is generated for selection without implementing a division operation. In some cases, the predefined interval for the probability range comprises a value that is a power of two. In some examples, the predefined interval for the probability range comprises a value equal to 256, such that the probability range includes values ranging from 0-255. In some cases, the cumulative vector ranges from a variable minimum value to a maximum cumulative value.

In some examples, the method further includes applying an offset value when selecting the pseudorandom value within the cumulative range. In some embodiments, the method further includes determining in which portion of the cumulative range of pixels the selected pseudorandom value lies. Still further, in some cases, at least a portion of the specified region of the video frame is sampled for pixel values. In such cases, pixel blocks of a specified size are sampled within the specified region of the video frame. In some embodiments, pixels outside of the pixel blocks remain unsampled, such that line buffers used to store pixel values are reduced in size.

In some embodiments, the dithering is applied in a region of the video frame that includes one or more flat color areas. In some cases, noise applied as part of the dithering includes one or more pre-computed values. In some examples, the encoder determines, for each region, whether to apply the pre-computed noise values during dithering.

In some cases, the method further includes outputting the dithered video frame to an electronic display. In some examples, the video frame is part of a video feed that is streamed to the electronic display. In some embodiments, computing the local distribution for the specified region of the video frame includes identifying two or more banding artifacts within the region. In some cases, computing the local distribution for the specified region of the video frame includes identifying local statistics for the region around a specified block of pixels. In some examples, applying dithering to the specified region of the video frame includes applying dithering to at least one block of pixels in the video frame.

A corresponding system includes at least one physical processor and physical memory comprising computer-executable instructions that, when executed by the physical processor, cause the physical processor to: access a video frame that includes multiple pixels, compute a local distribution for a specified region of the video frame that includes pixels that are likely to include banding artifacts, the computing including: defining a probability range for the local distribution that lies within a predefined interval, generating a cumulative vector, using the defined probability range, that includes a distribution of pixels values along a cumulative range of pixels that lie within the specified region of the video frame, and selecting a pseudorandom value within the cumulative range. The computer-executable instructions also apply dithering at least to the specified region of the video frame using the selected pseudorandom values within the cumulative range.

In some examples, a corresponding non-transitory computer-readable medium is provided that includes one or more computer-executable instructions that, when executed by at least one processor of a computing device, cause the computing device to: access a video frame that includes multiple pixels, compute a local distribution for a specified region of the video frame that includes one or more pixels that are likely to include banding artifacts, the computing including: defining a probability range for the local distribution that lies within a predefined interval, using the defined probability range, generating a cumulative vector that includes a distribution of pixels values along a cumulative range of pixels that lie within the specified region of the video frame, and selecting a pseudorandom value within the cumulative range. The computer-executable instructions also apply dithering at least to the specified region of the video frame using the selected pseudorandom values within the cumulative range.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
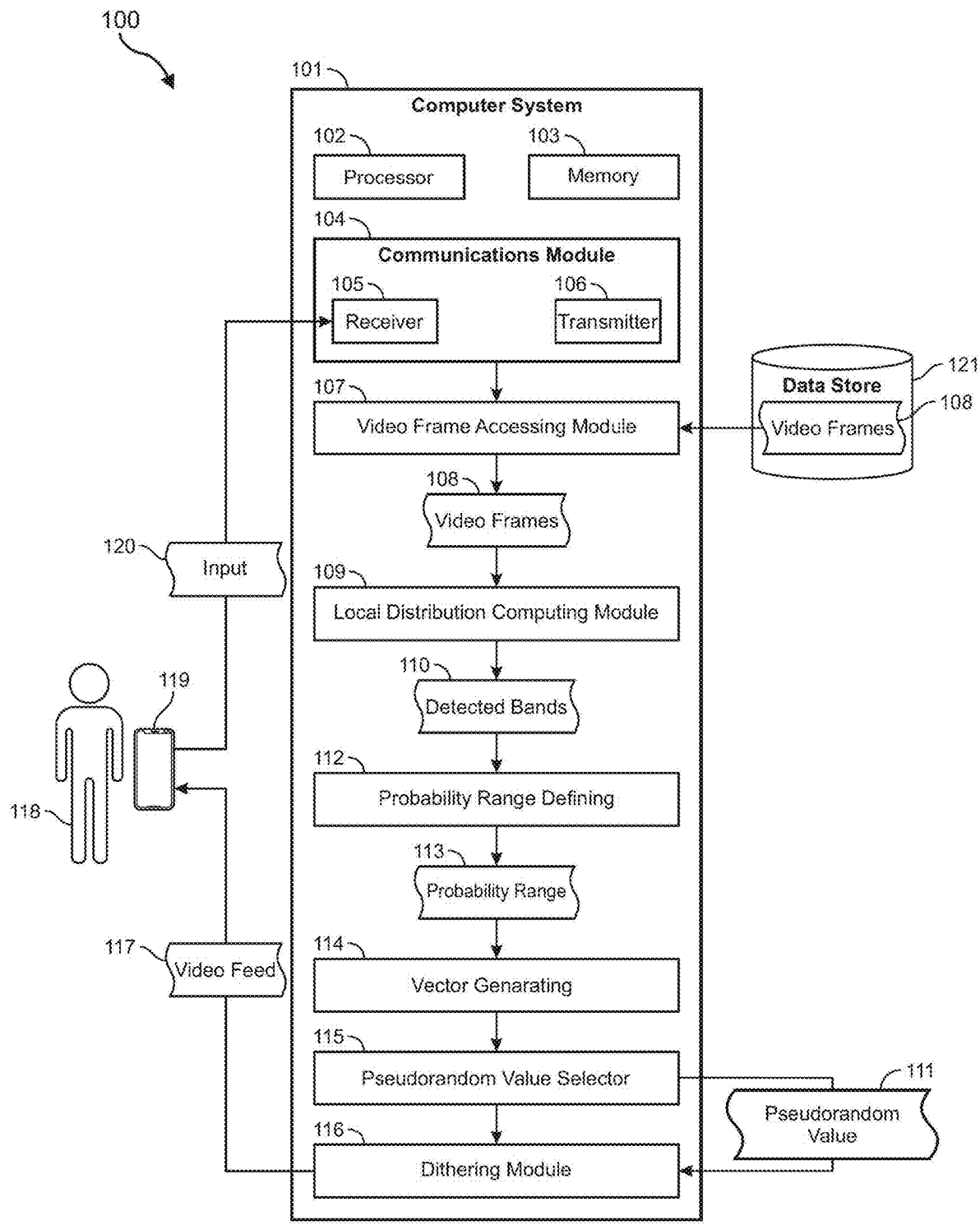
FIG. 1 illustrates an example computer architecture in which the embodiments described herein may operate.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to detecting and removing banding in video frames. The methods and systems described herein are designed to generate pseudorandom values for use in dithering in a much more computationally efficient manner. After the pseudorandom values have been generated and used in the dithering process, the video is provided to an electronic display for presentation to a user.

As noted above, some scenes in videos are more prone to artifacts than others. When videos are digitized, imperfections are often generated as part of the digitizing process. The digitizing process may include different steps that are taken when preparing videos for distribution, including compression, bit-depth reduction, and scaling to a lower resolution. Imperfections introduced during this process are often referred to as "artifacts," which take many different forms. Each of these artifacts causes some type of unnatural appearance in the video frame, and many artifacts are noticeable to users viewing the videos. As such, the artifacts are distracting and often remove the user from an otherwise immersive experience.

One particular type of artifact is referred to as a "banding artifact." Banding artifacts are stairstep-like contours that are introduced during the processing of certain scenes in a movie or tv show. For example, banding may occur when processing a spatially smooth, but slightly varying signal that gradually fades from one shade of grey to another or from one color to a slightly darker or lighter shade of that color (see FIG. 7A for an example of such). The banding is intensified during the encoding process as the video is prepared for playback on an electronic device.

In some cases, banding artifacts are found along smoothly varying regions in a video frame. Such banding artifacts are often visible, for example, in scenes containing large portions of sky, sunrises and sunsets, scenes containing oceans, darkly colored scenes, and other similar scenes. In some settings, the electronic devices that play back the videos also contribute to the banding by maximizing contrast or sharpness. The banding artifacts may be noticeable and, consequently, distracting to users. The artifacts also often contain noise or other anomalies in the banded regions that make the detection and removal of the bands from the video scenes very difficult. Traditional solutions that apply a low pass filter to these regions to remove the banding do not account for the noise and do little to remove the banding artifacts from the video frames.

The embodiments herein detect and remove banding artifacts using dithering techniques that more effectively and more efficiently identify and smooth the affected regions. This smoothing removes (or greatly reduces) the banding artifacts, making the viewing experience more enjoyable for the viewer. These image dithering techniques are configured to analyze video frames for specific pixels that are likely to cause banding in a given video frame. The systems herein then compute a local distribution for those regions of the video frame that include the identified pixels. Then, as part of the dithering, these systems define a probability range for the local distribution, generate a distribution of pixels along a specific range of the video frame, and select a pseudorandom value within the specified range. This pseudorandom value is then used to apply dithering to the video frame. In this manner, the systems herein more efficiently and precisely apply a dithering process to the identified regions to remove (or reduce) banding artifacts. This process will be described in greater detail below with reference to FIGS. 1-10.

FIG. 1, for example, illustrates a computing environment 100 in which banding artifacts are detected and removed. FIG. 1 includes various electronic components and elements including a computer system 101 that is used, alone or in combination with other computer systems, to perform associated tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules may be hardware-based, software-based, or may include a combination of hardware and software. Each program module uses computing hardware and/or software to perform specified functions, including those described herein below.

In some cases, the communications module 104 is configured to communicate with other computer systems. The communications module 104 includes substantially any wired or wireless communication means that can receive and/or transmit data to or from other computer systems. These communication means include, for example, hardware radios such as a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 is configured to interact with databases, mobile computing devices (such as mobile phones or tablets), embedded computing systems, or other types of computing systems.

The computer system 101 further includes a video frame accessing module 107. The video frame accessing module 107 is configured to access video frames 108. The video frames 108 are stored in a data store 121 or are streamed from another source. The data store 121 may be local to the computer system 101 or remote. In some cases, the data store 121 is a distributed data store or cloud-based data store. The video frames 108 represent frames of a movie, tv show, internet video, or other portion of video content. The video frame accessing module 107 typically accesses sequences of video frames, although in some cases, the video frames 108 are single frames.

The video frame accessing module 107 provides the video frames 108 to the local distribution computing module 109. The local distribution computing module 109 computes a local distribution for a specified region of the video frame 108 that includes specified pixels that are likely to include banding artifacts (e.g., 110). Once the local distribution computing module 109 has identified certain pixels as being likely to contribute to banding (or likely to be part of a banding artifact 110), the local distribution computing module 109 uses the local distribution among the identified pixels to refine the detection of banding artifacts and determine a dither noise probability distribution. Such a local distribution, as will be explained further below, gathers statistics around each pixel or block of pixels (in some cases, these blocks of pixels may be identified by a spatial mask). These statistics include ranges of pixel values around the current pixel for or around which banding is being detected.

In the embodiments described herein, the probability range defining module 112 of computer system 101 is used to define a probability range 113 for the local distribution that lies within a predefined interval. Using this probability range 113, the vector generating module 114 can then generate a cumulative vector that includes a distribution of pixel values along a cumulative range of pixels that lie within the specified region of the video frame 108. The pseudorandom value selector 115 then selects a pseudorandom value 111 within the generated cumulative range.

By first defining a probability range 113, then generating a cumulative range of pixels, and then selecting a pseudorandom value within the cumulative range, the embodiments herein effectively avoid computational operations that would involve division. In some cases, these steps are performed, and the pseudorandom value 111 is selected, only using addition, multiplication, or bit shifting operations. Each of these types of operations are computationally much easier and more efficient than division operations. This, in turn, allows pseudorandom values within a specified range of pixels to be selected and implemented using significantly fewer CPU cycles and less memory during computation.

This pseudorandom value 111 is then used to generate pixel values for dithering the video frames 108. Indeed, the dithering module 116 of computer system 101 applies dithering using the pseudorandom values 111 to appropriately smooth out the identified bands 110. The dithered video feed 117 is then sent to one or more users 118 and/or their associated electronic devices 119 for viewing. In some cases, the video frame 108 is part of a dithered video feed 117 that is streamed to the electronic display. Still further, at least in some cases, the user 118 is permitted to alter settings related to artifact detection, including changing settings related to banding artifact detection and removal via input 120. In some implementations, the dithered video frames are additionally sent to the data store 121 and/or to other computer systems or storage systems. The process described above will be described in greater detail with respect to method 200 of FIG. 2 and FIGS. 1-9 below.

Figure 2:
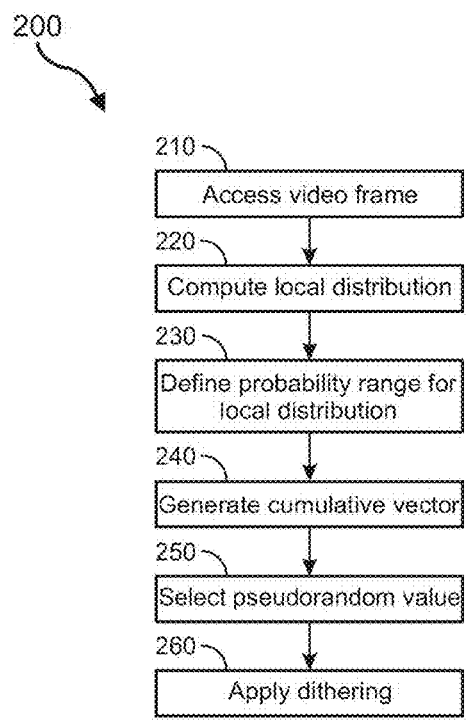
FIG. 2 illustrates a flow diagram of an exemplary method for detecting and removing banding artifacts in video frames.

FIG. 2 is a flow diagram of an exemplary computer-implemented method 200 for detecting and removing banding in video frames. The steps shown in FIG. 2 may be performed by any suitable computer-executable code and/or computing system, including the systems illustrated in FIG. 1. In one example, each of the steps shown in FIG. 2 may represent an algorithm whose structure includes and/or is represented by multiple sub-steps, examples of which will be provided in greater detail below.

Method 200 includes, at 210, a step for accessing a video frame 108 that includes multiple different pixels. At step 220, method 200 includes computing a local distribution for a specified region of the video frame that includes one or more pixels that are likely to include banding artifacts 110. The computing includes defining, at step 230, a probability range for the local distribution that lies within a predefined interval, using the defined probability range, at step 240, to generate a cumulative vector that includes a distribution of pixels values along a cumulative range of pixels that lie within the specified region of the video frame 108. At step 250, the method includes selecting a pseudorandom value 111 within the cumulative range and, at step 260, applying dithering at least to the specified region of the video frame using the selected pseudorandom values within the cumulative range.

As noted above, the embodiments herein may greatly reduce the required computational load to select appropriate pseudorandom values for generating pixels whose values are tied to the pseudorandom values within a specific range. Keeping the pseudorandom values within the specified range ensures that the pseudorandom noise will, within certain parameters, match or vary only slightly from the colors that are involved in the banding artifact that was detected. In order to generate a range of appropriate values for pixel dithering, the embodiments herein implement p_values. This process will be better understood after first describing FIGS. 3-7B.

Figure 3:
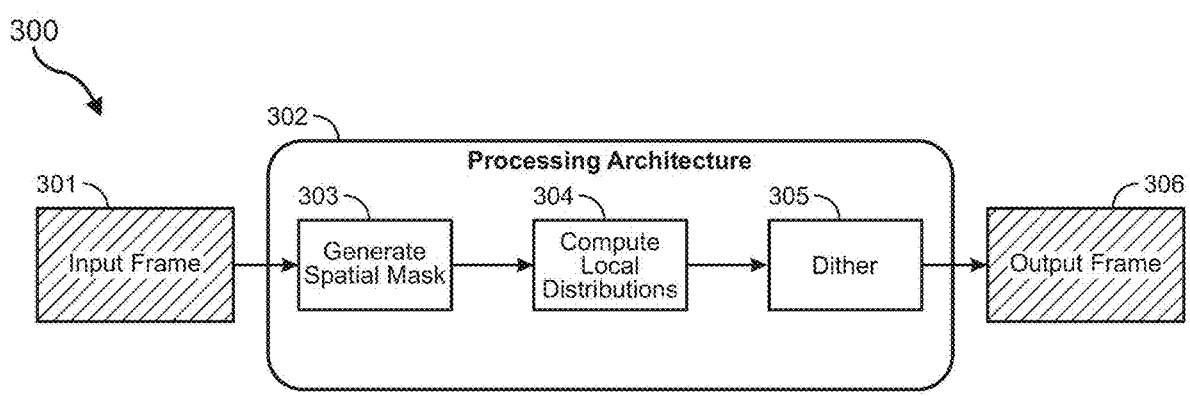
FIG. 3 illustrates an alternative example computer architecture in which the embodiments described herein may operate.

FIG. 3 illustrates an example embodiment 300 of a processing architecture 302. The processing architecture 302 includes a module 303 to generate a spatial mask, a module 304 to compute local distributions, and a module 305 to perform dithering. Input frames 301 are provided to the processing architecture 302 and, upon being processed by some or all of the modules 303-305, the processing architecture produces output dithered video frames 306. In some embodiments, additional pre-processing steps are performed, as shown in FIG. 4.

Figure 4:
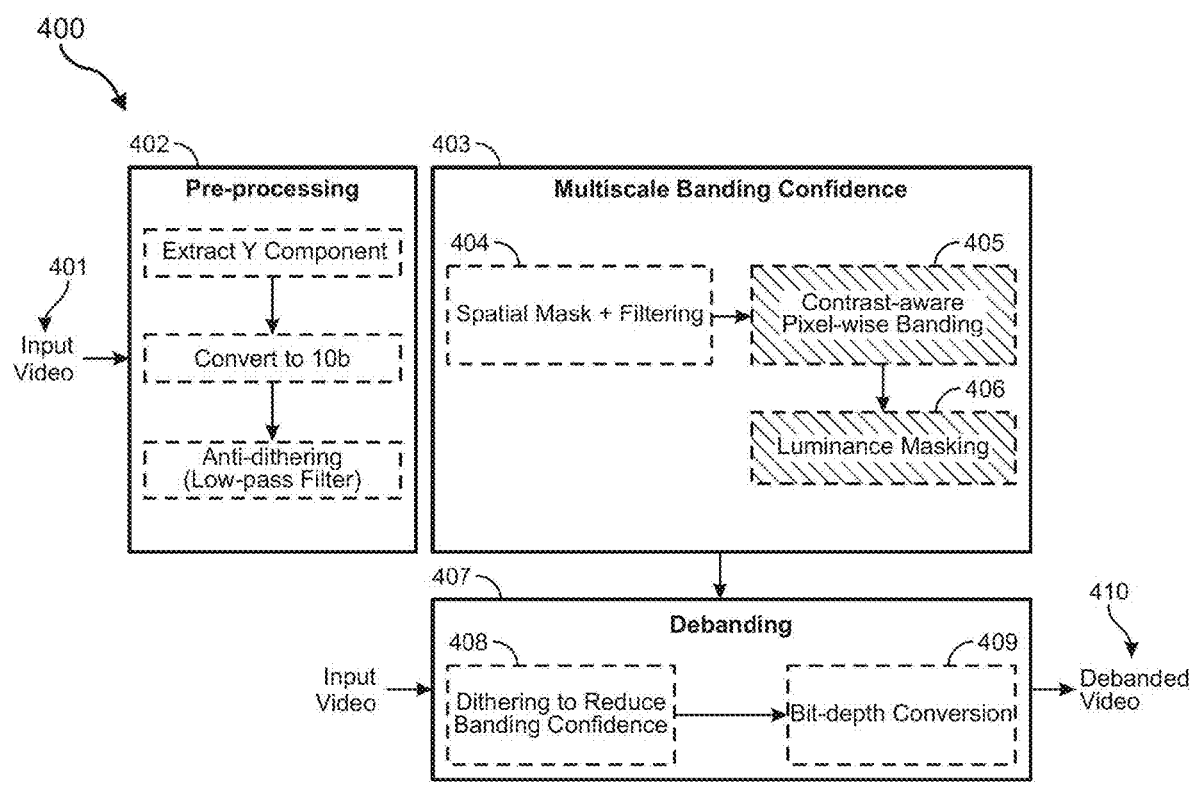
FIG. 4 illustrates an embodiment in which an input video is pre-processed and debanded according to embodiments described herein.

For instance, in embodiment 400 of FIG. 4, a pre-processing module 402 performs different tasks on the input video 401 before band detection and debanding are performed (in modules 403 and 407, respectively). In this example, the pre-processing module 402 receives the input video 401 and extracts luma (Y) components for some or all of the pixel values in the input video. When necessary, the luma components are then converted to 8-bit or 10-bit components. The pre-processing module 402 may also apply an anti-dithering low-pass filter to some or all of the pixel values in the input video 401.

The multiscale banding confidence module 403 then generates a spatial mask at 404 and optionally performs some filtering to reduce the number of pixels that are analyzed at subsequent steps. At least in some cases, the multiscale banding confidence module 403 performs one or more iterations of contrast-aware, pixel-wise band detection at 405 and luminescence masking at 406. The debanding module 407 can then perform dithering at 408 and bit-depth conversion at 409 to provide a debanded output video 410 for presentation on an electronic display (e.g., 119 of FIG. 1).

Figure 5A:
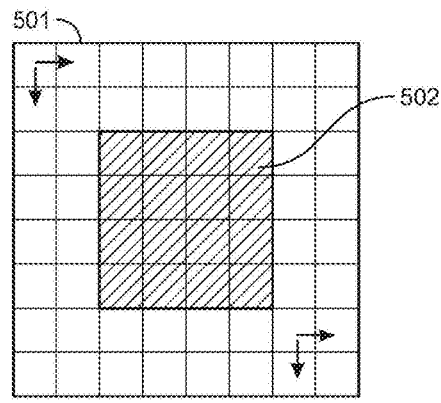
FIG. 5A illustrates an embodiment including a block of pixels that is to be analyzed for banding.
Figure 5B:
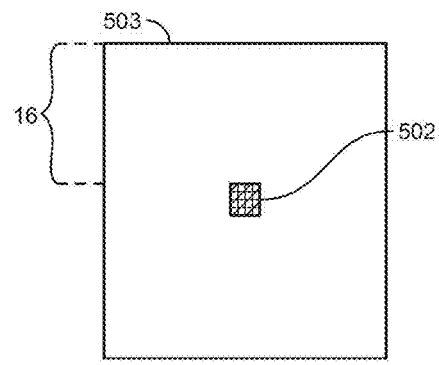
FIG. 5B illustrates an embodiment in which a region surrounding a block is identified and used in various embodiments herein.

FIGS. 5A and 5B illustrate examples of this process. In some embodiments, a spatial mask is generated for a block of pixels. In some cases, the block of pixels is a specified size, such as the 4×4 block of pixels 502 shown in FIG. 5A. In some embodiments, a spatial mask policy is in place that specifies at least a minimum number of adjacent pixels that are to be used when generating the spatial mask 404. In some embodiments, the systems described herein count the number of pixels with zero derivatives in an 8×8 (or other size) window 501 around the 4×4 (or other size) block of pixels 502. These systems then assign the 4×4 block to the spatial mask if the count is larger than a threshold value. In some cases, this threshold value depends on the frame resolution of the input video frame (e.g., 401). Thus, the threshold value is higher for ultra-high definition (UHD) resolution and above, with lower resolution frames having a lower threshold value.

In some cases, generating a spatial mask for a video frame includes, for each block of pixels 502, determining the number of zero derivative values in the region around the block of pixels (e.g., window 501, or within a larger window 503, as shown in FIG. 5B). Generating the spatial mask also includes assigning the block of pixels 502 to the spatial mask 404 if the determined number of zero derivative values in the region is above a threshold value. Thus, because the spatial mask indicates the likelihood that given pixels include banding artifacts, if the number of zero derivatives in the window 501 is large enough (i.e., at or beyond the specified threshold value), that block is determined to be likely to have banding and is thus assigned to the spatial mask.

After a spatial mask has been generated indicating which pixels or which blocks of pixels are likely to have banding artifacts, the systems herein compute a local distribution that identifies banding within the pixels or blocks identified by the spatial mask. In some cases, this involves identifying two or more bands within a given region (e.g., window 503). In some embodiments, computing the local distribution includes identifying local statistics for the region around a specific block of pixels (e.g., window 503). In some cases, the window size is a parameter that is set to a specific value by default. In at least some embodiments, the window size is adjustable according to the width and height or resolution of the video frame.

The local statistics may include p_values for the pixels in the block of pixels. The p_values refer to the number of pixels in the window with a value equal to a pixel_value+a value (d). The information gathered to perform the subsequent dithering step is the number of pixels in the window with a value equal to each entry in the range [pixel_value−max_diff, pixel_value+max_diff]. As such, the p_values p(d) for d=−max_diff . . . max_diff around each 4×4 block are collected for use in dithering.

Figure 5C:
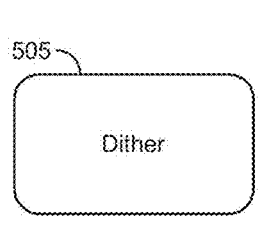
FIG. 5C illustrates an embodiment in which pixel values are dithered within a specified range of values.
Figure 5C:
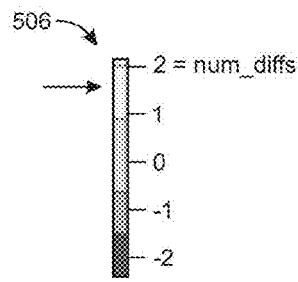
Figure 5D:
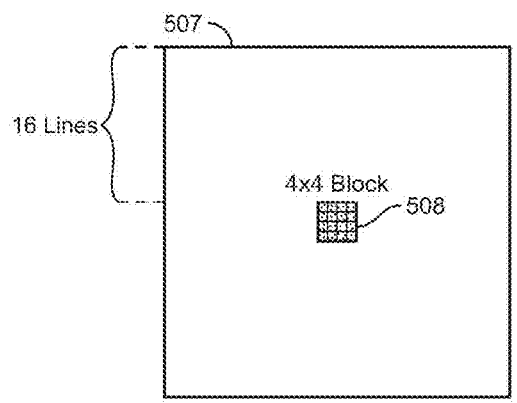
FIG. 5D illustrates an embodiment in which pixels used for local statistical computation are sampled from an image.
Figure 5D:
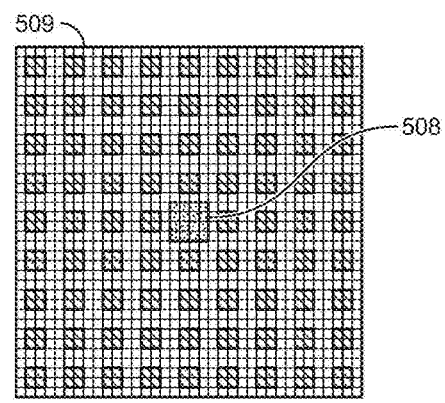
Figure 6:
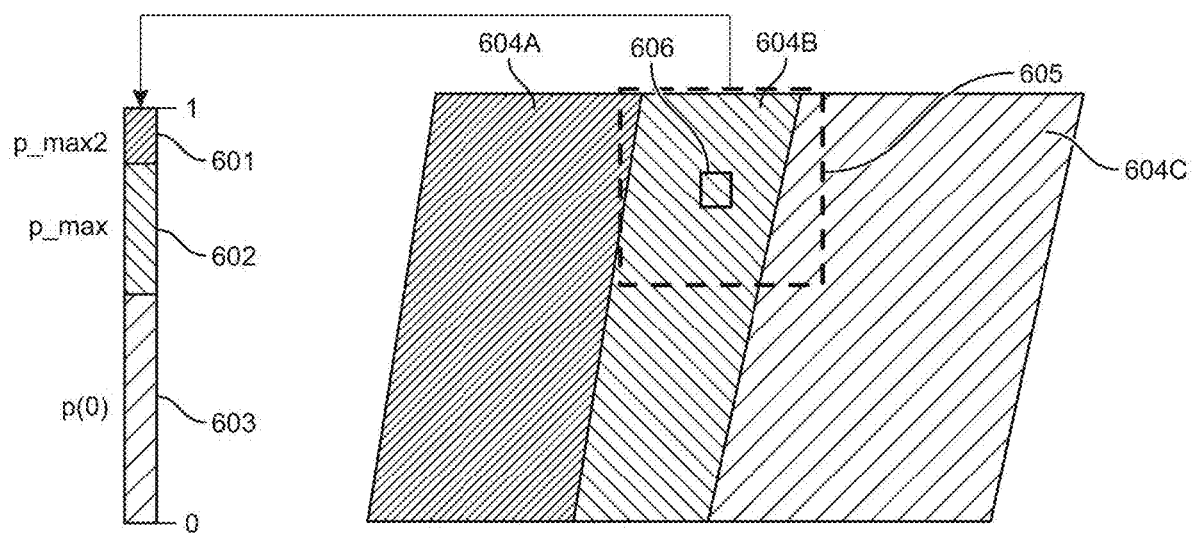
FIG. 6 illustrates an embodiment in which a banding window is implemented to identify banding in video frames.

In some cases, identifying the local statistics for the region includes identifying the band of the current pixel and the largest and the second largest bands, and then applying dithering to the detected bands in the video frame. Alternatively, the systems herein consider each of the bands between −max_diff and +max_diff, regardless of the size. Indeed, as shown in FIG. 5A-5C, a block of pixels 502 as well as other pixels around the block may be sampled (e.g., a window 503 of 16 pixels), and dithering 505 may be applied within a range of values, as shown at 506. This sampling and dithering may identify and cover multiple bands between positive and negative max_diff values. FIG. 6 further indicates how dithering is applied to one or more of the pixels in the video frame. The dithering is applied by creating a pseudorandom number to generate noise used in the dithering. A dithering probability distribution is thus generated using the size of the band to which the pixel belongs and the two other largest bands in the window.

As shown in FIG. 6, a region 605 may cover three (or more) separate bands between shades 604A, 604B, and 604C. The identified block of pixels 606 lies in color shade 604B. When selecting a pseudorandom value for dithering along the bands between shades 604A and 604C, the system determines a p(0) value 603 indicating the number of pixels in the window with a value equal to the current pixel value, while the p_max 602 and p_max2 601 values indicate the largest and second largest bands in the window. This process ensures that the pseudorandom values selected will be the best-suited values to create a seamless visual transition between color shades, thereby removing (or at least reducing the effects of) the banding artifacts. This is shown in the contrast between image 701 of FIG. 7A, which shows multiple banding artifacts and image 702 of FIG. 7B in which banding has been reduced or largely removed. In at least some embodiments, a higher number of bands are analyzed to provide a more seamless visual transition.

In some cases, creating the pseudorandom number for dithering (or, more specifically, as part of noise generation for the dithering) includes indexing a random vector and multiplying by a random number based on a selected pixel value. This process of selecting and indexing a random vector and then multiplying by a random number that is generated from a specific pixel value, pixel histogram, and/or pixel location, provides a random number that is tied to an initial pixel value. In this manner, the noise value that is ultimately derived and used in dithering will be randomly generated and will be based on the pixel location and pixel values of pixels in the window (e.g., a pixel that is within the region 605). The calculated probability value (e.g., 603) is then used to dither by updating the pixel values. In some cases, the probability value is calculated as part of computing the local distribution (e.g., 304 of FIG. 3).

Additionally or alternatively, in some cases, the pseudo-random value used for dithering is generated according to the statistics gathered as part of computing the local distribution. In one embodiment, the pseudorandom value is generated using p_values for a 4×4 block and the column and row of the pixel. In such cases, the pseudorandom value may be equal to (the pixel's column identifier*the pixel's row identifier*a hard-coded randomly generated vector with 64 6-bit entries*the p_values for the 4×4 block). This pseudorandom value is then used to provide noise that breaks down the appearance of any bands that may be present in the identified region.

The embodiments described herein further simplify this process. This simplification not only reduces the computational load on the computing system performing the dithering, the simplification also provides subjective quality gains due to the improved operational properties of the pseudorandom number selection. As noted above, probability ranges used in dithering are variable and depend on the p_values. The embodiments described herein define a probability range in a known and pre-defined interval that, at least in some cases, is a power of two.

In one example, 256 may be used as a power of two in the determination of a probability range. For instance, in some cases, the cumulative appearance of specified pixel values is computed by adding the p_values in the considered pixel value range. This embodiment assumes that all (or substantially all) of the p_values are considered from −max_diff to max_diff (other options are also possible). Then, the cumulative range defined by the cumulative vector generating module 114 would be defined as:

$$\text{cumul}(-\text{max\_diff}) = p(-\text{max\_diff}) \text{cumul}(\text{diff}) =$$
$$\text{cumul}(\text{diff}-1) + p(\text{diff}) \text{ for diff} = -\text{max\_diff} + 1 \text{ to max\_diff}$$

In this embodiment, the "cumul" vector would contain the cumulative distribution of the pixel values and would be tied to a dithering value that gives the updated pixel value. The cumulative vector, in this case, is not normalized (from 0 to 1), but instead, ranges from 0 to cumul(max_diff). Then, the embodiments herein pick a (pseudo)random number within the cumulative range and check in which range of the cumulative function the random number falls. That is, the embodiments herein determine which diff value the selected value corresponds to.

Continuing this example, the total cumulated value in the local histogram, cumul(max_diff), is multiplied by a pseudo-random value between 0 and 1 (Equation 1 below). Randomness is introduced a priori (hard-coded) via a vector of 256 (in this case) entries with the elements from 0 to 255 randomly shuffled. Thus, the vector would include {0-255} values, with the values being shuffled randomly.

The mapping to the range (pr_range) is then achieved by just a multiplication and a bitwise shift operation as follows:
pr_range=(pseudo_random*cumul(max_diff))>>8 (Equation 1), where pseudo_random=rvals[offset]. As such, pr_range is a value between 0 and cumul(max_diff). The diff corresponding to the computed pr_range can be found simply via comparisons: dither_value=−max_diff, while(pr_range>cumul(dither_value)), dither_value++. The offset that indexes rand_vals to obtain pseudo_random greatly improves the effectiveness and efficiency of the algorithm.

In one embodiment, the systems described herein instance the original function definition, pseudo_random(row, col) =function(row, col, p_values, pixel_value) with the following specific embodiment where offset is offset=(p(0)+ (col*row)+(row^col)) & 255. And so, pseudo_random=rvals [(p(0)+(col*row)+(row^col)) & 255], which is significantly less computationally complex than other implementations that implemented remainders and divisional operations: pseudo_random=rvals[col& 63]*rvals[row& 63]*rvals [(pixel_value+p(0)) & 63].

Still further, as noted with respect to FIGS. 5A and 5B, line buffers may be a source of significant computational cost in the hardware implementation of video decoders. As mentioned above, line buffers store the data necessary to process the pixel block being decoded. Typically, the line buffers include multiple rows of pixels above the current block (e.g., as shown in FIG. 5B). Line buffers occupy a large on-chip circuit area, and limiting their number is beneficial for improving video processing and delivery. For example, some video coding standards, such as AV1, require 10 lines of buffer space.

The local distribution computation step collects data in a window centered around the 4×4 (or other size) pixel block being processed. The window size depends on the resolution of the encoding. The maximum window size, at least in some cases, is 36×36 for 4 k (and above) and smaller window sizes with decreasing resolution. Therefore, the required number of line buffers to accommodate the 36×36 window around a 4×4 block is 16, which is higher than AV1. Each 4×4 block is 16 pixels, i.e., 160 bits per block for 10-bit content. In terms of line buffers, storing the pixel data for prior solutions would require (considering a max tile size is 4096) 16 lines*4096 pixels/line*10 bits/pixel=81.9 kBytes. Some embodiments focus on video frames having flat areas with little variability. As such, the storage can be reduced with little impact to the N (most common) values in each 4×4 block, where N is a parameter. Then, the required storage for a 4×4 block is the N pixel values plus the N counts (4 bits) of how many times a pixel value appears.

For instance, for N=3, the storage becomes 3 pixels*(10 bits/pixel_value+4 bits/pixel_count)=42 bits per block. As such, the total memory is reduced by a factor of ~3.8×: 81.9 kBytes*42/160=21.5 kBytes. If N=4, the memory reduction is ~2.9×, while for N=5, the reduction is ~2.3×. If a block has more than N pixel values, then a decision is to be made on which information to store. The following options are possible: 1. The block with more than N values can be discarded and removed from the spatial mask. Such a block is not flat enough, and the number of pixel values becomes another condition for flatness. 2. Only the N highest-occurring pixel values are stored. Or, 3. Only the first N pixel values in a scanning order are stored. At least in some embodiments, the computational cost associated with the counting of the pixel values increases in a pixel block.

In the embodiments herein, four fewer bits are used per block since the number of pixel values is guaranteed to sum up to 16. As such, the last four bits of the pixel count are redundant. In that case, for N=4, the storage needed is 4 pixels*10 bits/pixel_value+3 pixels*4 bits/pixel_count=52 bits per block, leading to a reduction of ~3.1× and a storage requirement of 81.9 kBytes*52/160=26.6 kBytes. Since the pixel blocks analyzed are flat, the systems described herein can assume that the pixel values are highly similar. For example, the pixel values may be within the −max_diff to +max_diff range, or similar. Then, the storage of a pixel value would not require the whole 10 bits, but rather only the difference with respect to a first signaled value. That difference can be stored in less than 10 bits. Indeed, in some cases, three bits is sufficient. Thus, in this embodiment, the storage for N=3 would be: 10 bits/pixel_value+2 pixels*3 bits/pixel_value+3 pixels*4 bits/pixel_count=28 bits per block, a significant memory savings over prior solutions.

Figure 7A:
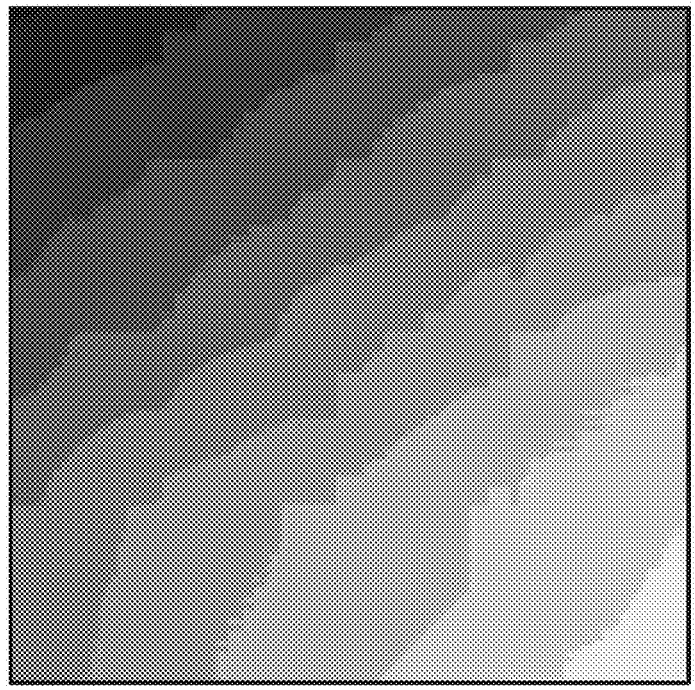
FIGS. 7A & 7B respectively illustrate before and after images in which debanding is applied.

As noted above, the embodiments herein are designed to dither areas of an image that have dithering bands, and especially to dither on the transitions between the bands. FIG. 7A illustrates a cropped frame 701 encoded with AVM on the left and the same area after applying dithering. The banding mitigation is visible in FIG. 7B. On the bottom-right corner of the debanded area of the filtered frame (FIG. 7B), it can be observed a flat region on the larger bands that is not dithered (i.e., has uniform color without noise pixels). This happens because the bands are large compared to the local statistics window size. In the extreme case, when all the pixels of the window have the same value, the system does not perform dithering, since the probability of keeping the current value is 1. However, as described further below, it may be desirable to introduce dither or noise in the areas that are not part of the transition in such large bands.

One embodiment introduces noise in the blocks (areas) that are flat and that belong, almost or entirely, to a single band (i.e., that are not close to a transition). The shape of such noise is, at least in some embodiments, predefined, since it does not depend on the local statistics (basically, a flat area with single value). In some cases, the shape can be implemented with pre-computed noise. The noise that is introduced is to be dither-like (e.g., white noise, blue noise, etc.) or even film grain noise. In some embodiments, which are computationally simpler, noise is pre-computed, for example, a per-sequence or per-frame level. This noise is then stored in an array. Thereafter, a patch is gathered from the array and added to the current block.

This implementation that dithers the frame with pre-computed noise can be invoked whenever the block is flat, and whenever the local statistics show that the pixel block is in a large band that is far from a transition. For instance, in one example, a condition would state that all the pixels in a 4×4 block have the same value and p(0) >=threshold*pixels_in_window, which checks the occurrences of the pixel value with respect to the window size. If, for instance, the value appears a very high percentage of times in the window, then the noise is added from the pre-computed array. Another way to invoke the pre-computed noise is by explicit signaling for it. In such cases, the encoder would select, for each region (e.g., 64×64 blocks, 16×16, etc.), whether the pre-computed dither is to be applied. At the decoder, the signaling is read, and the dither is applied when indicated. In some cases, either implicit or explicit signaling may be used to trigger the incorporation of pre-computed noise.

At least in some cases, the noise (whether pre-computed or computed dynamically when needed for dithering) is generated using pseudorandom values. In the embodiments herein, the pseudorandom values are generated for implementation in dithering using multiplication, addition, or bit shifting operations, without implementing division operations. These operations, as noted above, are less computationally complex, at least in part, because they don't need to keep track of remainders that come as part of division operations. To further simplify, at least in some cases, the predefined interval for a probability range used when determining the pseudorandom values is a value that is a power of two. In some cases, the predefined interval for the probability range is a value equal to 256, for example, or 512 or 1024. In such cases, the probability range would include values ranging from 0-255, 0-511, or 0-1023. This may ensure that each of the addition, multiplication, and/or bit shifting operations result in whole integer values.

In some embodiments, the cumulative vector (as described above) ranges from a variable minimum value to a maximum cumulative value. After defining this cumulative range for the cumulative vector, an offset value may be applied when selecting the pseudorandom value within the cumulative range. In some cases, the offset indexes the random values in the vector to obtain a pseudorandom value. As part of this process, the system determines in which portion of the cumulative range of pixels the selected pseudorandom value lies. Continually determining the portion of the range of pixels corresponding to the pseudorandom value ensures that values among each specific range are represented in the pseudorandom values which, in turn, ensures that the dithering pixel values are appropriate for the location in the associated image.

Still further, in some cases, sampling from nearby pixels is used to refine the pixel values used in dithering. For instance, in the embodiment shown in FIG. 5D, a video frame 509 is broken down or divided into different regions (e.g., 508). When the sampling of nearby pixels is performed, the sampling process analyzes at least a portion of a specific region (e.g., 507) of the video frame for pixel values. During this sampling process, pixel blocks of a specified size (e.g., 4×4 blocks) are sampled within the specified region of the video frame (i.e., the dark outlined boxes in FIG. 5D). In such cases, pixels outside of the pixel blocks (e.g., 508) remain unsampled. The unsampled pixel blocks do not need to be retained in a line buffer memory. Thus, by only sampling pixel blocks of a specific size and by avoiding the sampling of other blocks, the embodiments herein use less memory when performing sampling, allowing the line buffers used to store pixel values to be reduced in size.

Figure 7B:
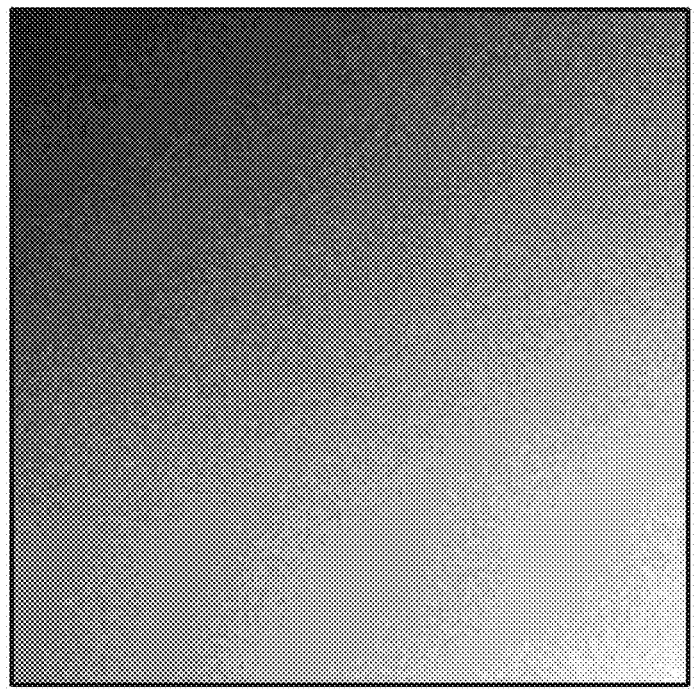

As noted in regard to FIGS. 7A and 7B, in some cases, dithering is applied in regions of a video frame that include flat color areas. In some embodiments, when noise is applied as part of the dithering to those flat color areas, the systems herein will implement pre-computed values. In some cases, these pre-computed values are applied prior to encoding the video frames, while in other cases, the pre-computed values are applied during the encoding process. In such cases, the encoder determines, for each region of the video frame, whether to apply the pre-computed noise values during dithering. In cases where dithering is not needed, it is not applied. And, if dithering is needed, the systems herein determine dynamically, for each region of the frame, whether to use pre-computed values or to dynamically determine the noise values, using pseudorandom values, at the time of encoding.

Once the dithered video frames (and non-dithered video frames) have been encoded, the video frames are transmitted to an electronic display (e.g., mobile electronic device 119 of FIG. 1) via video feed 117. The dithered frames may be streamed to an electronic device or may be transmitted and downloaded for later playback. Due to the dithering, the video frames may appear more uniform in their coloring and may include fewer banding artifacts. In some cases, determining the local distribution of a specified region of one of the video frames includes identifying multiple different banding artifacts within that region. In some cases, this process is further refined by computing local statistics for the specified region around a specific block of pixels. In such cases, dithering is applied to at least one block of pixels in the video frame. These refinements allow dithering to be performed more efficiently, using fewer computing resources, and also more effectively, markedly reducing the appearance of banding artifacts in movie and tv video frames.

In addition to the method described above, a corresponding system is also provided. The system includes at least one physical processor and physical memory comprising computer-executable instructions that, when executed by the physical processor, cause the physical processor to: access a video frame that includes a plurality of pixels, compute a local distribution for a specified region of the video frame that includes one or more pixels that are likely to include banding artifacts, the computing including: defining a probability range for the local distribution that lies within a predefined interval, using the defined probability range, generating a cumulative vector that includes a distribution of pixels values along a cumulative range of pixels that lie within the specified region of the video frame, and selecting a pseudorandom value within the cumulative range, and apply dithering at least to the specified region of the video frame using the selected pseudorandom values within the cumulative range.

Furthermore, a corresponding non-transitory computer-readable medium is provided that includes one or more computer-executable instructions that, when executed by at least one processor of a computing device, cause the computing device to: access a video frame that includes a plurality of pixels, compute a local distribution for a specified region of the video frame that includes one or more pixels that are likely to include banding artifacts, the computing including: defining a probability range for the local distribution that lies within a predefined interval, using the defined probability range, generating a cumulative vector that includes a distribution of pixels values along a cumulative range of pixels that lie within the specified region of the video frame, and selecting a pseudorandom value within the cumulative range, and apply dithering at least to the specified region of the video frame using the selected pseudorandom values within the cumulative range.

Figure 8:
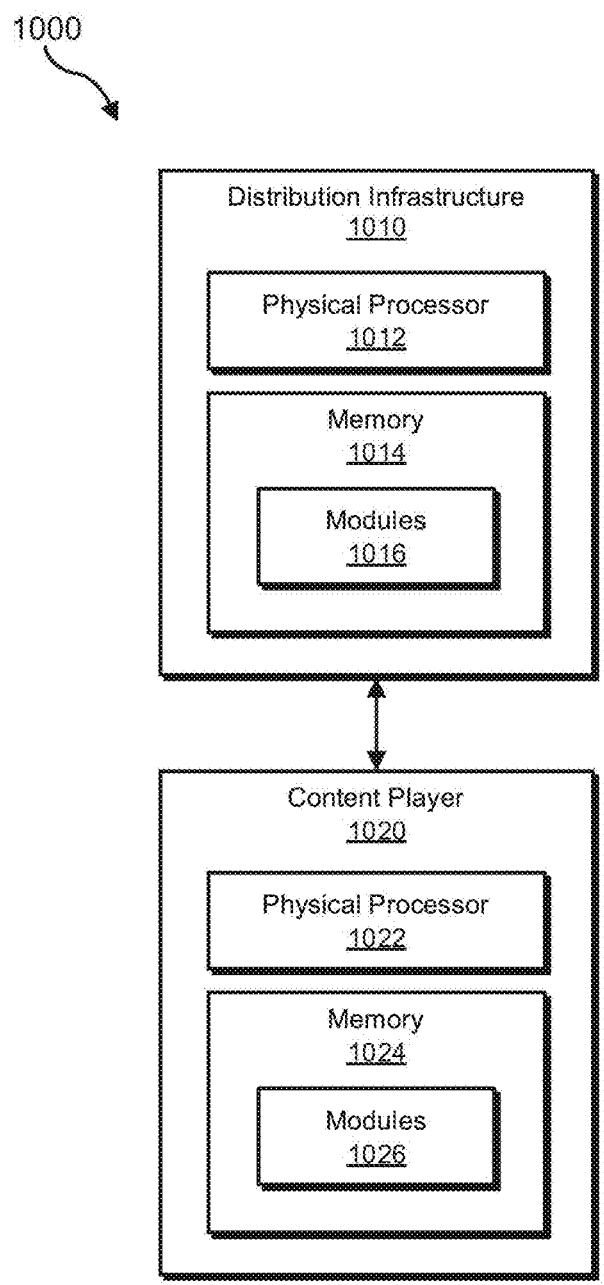
FIG. 8 is a block diagram of an exemplary content distribution ecosystem.
Figure 10:
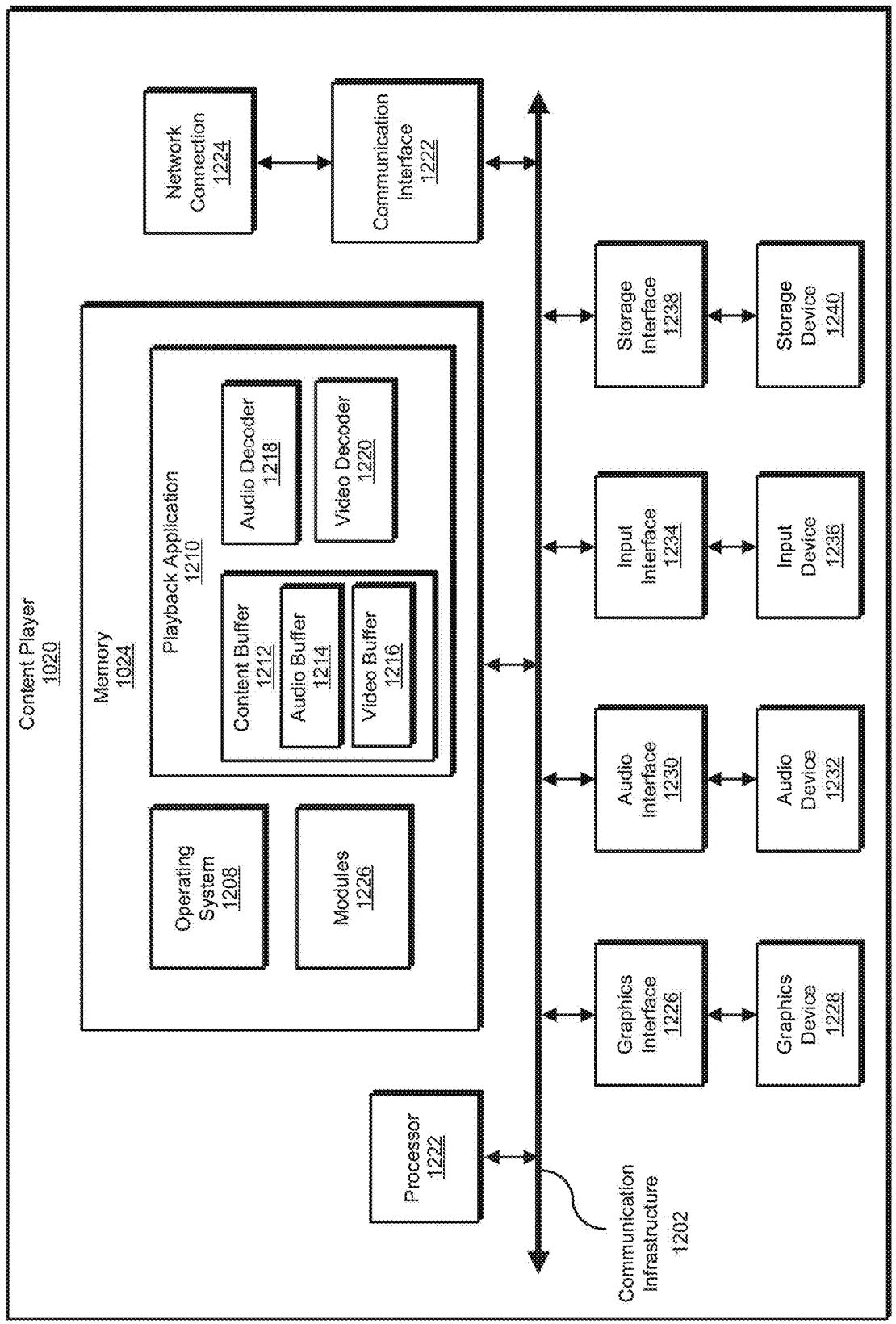
FIG. 10 is a block diagram of an exemplary content player within the content distribution ecosystem shown in FIG. 9.

The following will provide, with reference to FIG. 8, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-7B.

FIG. 8 is a block diagram of a content distribution ecosystem 800 that includes a distribution infrastructure 810 in communication with a content player 820. In some embodiments, distribution infrastructure 810 is configured to encode data at a specific data rate and to transfer the encoded data to content player 820. Content player 820 is configured to receive the encoded data via distribution infrastructure 810 and to decode the data for playback to a user. The data provided by distribution infrastructure 810 includes, for example, audio, video, text, images, animations, interactive content, haptic data, virtual or augmented reality data, location data, gaming data, or any other type of data that is provided via streaming.

Distribution infrastructure 810 generally represents any services, hardware, software, or other infrastructure components configured to deliver content to end users. For example, distribution infrastructure 810 includes content aggregation systems, media transcoding and packaging services, network components, and/or a variety of other types of hardware and software. In some cases, distribution infrastructure 810 is implemented as a highly complex distribution system, a single media server or device, or anything in between. In some examples, regardless of size or complexity, distribution infrastructure 810 includes at least one physical processor 812 and at least one memory device 814. One or more modules 816 are stored or loaded into memory 814 to enable adaptive streaming, as discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 includes a physical processor 822, memory 824, and one or more modules 826. Some or all of the adaptive streaming processes described herein is performed or enabled by modules 826, and in some examples, modules 816 of distribution infrastructure 810 coordinate with modules 826 of content player 820 to provide adaptive streaming of multimedia content.

In certain embodiments, one or more of modules 816 and/or 826 in FIG. 8 represent one or more software applications or programs that, when executed by a computing device, cause the computing device to perform one or more tasks. For example, and as will be described in greater detail below, one or more of modules 816 and 826 represent modules stored and configured to run on one or more general-purpose computing devices. One or more of modules 816 and 826 in FIG. 8 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 812 and 822 generally represent any type or form of hardware-implemented processing unit capable of interpreting and/or executing computer-readable instructions. In one example, physical processors 812 and 822 access and/or modify one or more of modules 816 and 826, respectively. Additionally or alternatively, physical processors 812 and 822 execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 stores, loads, and/or maintains one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
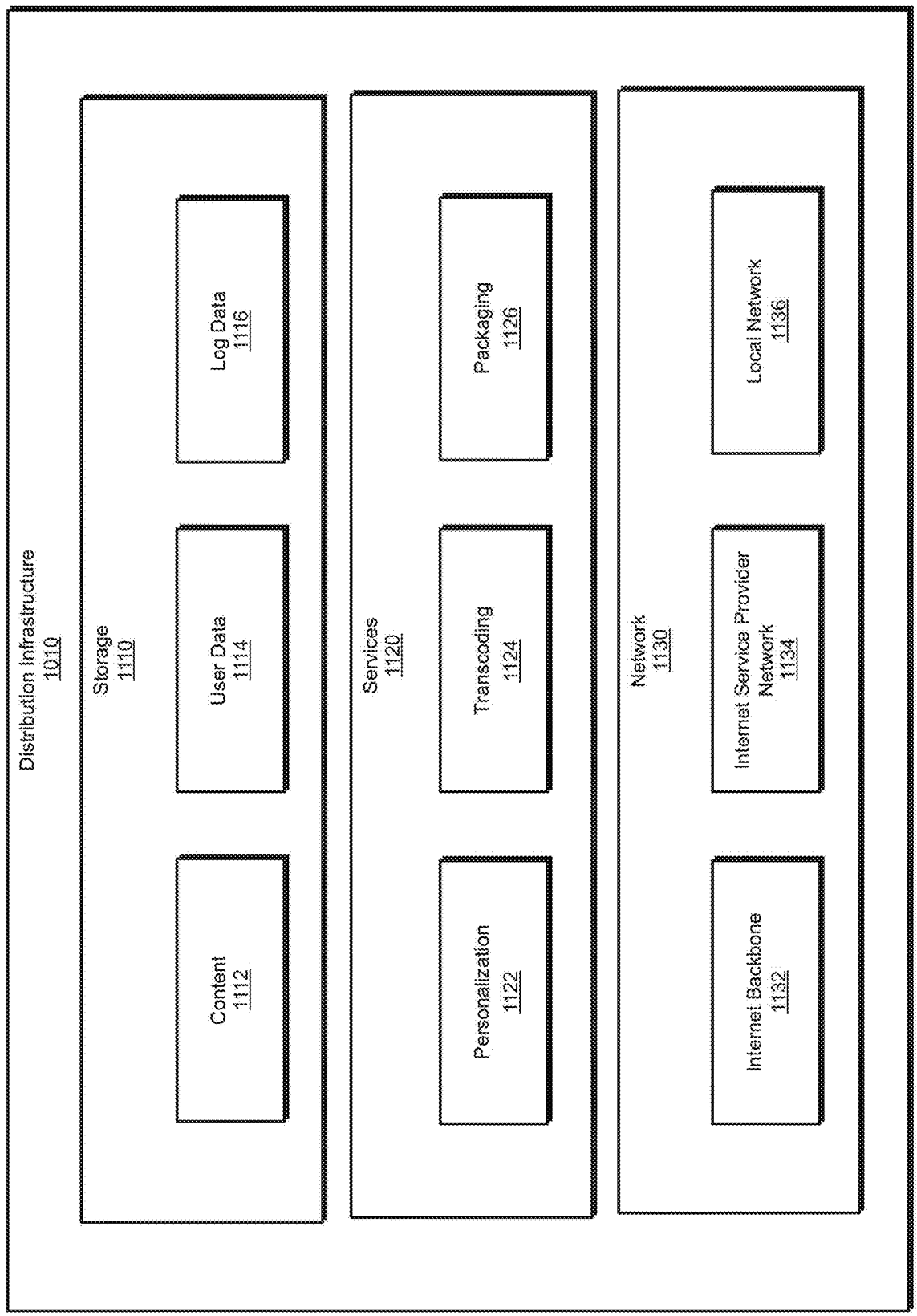
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 includes storage 910, services 920, and a network 930. Storage 910 generally represents any device, set of devices, and/or systems capable of storing content for delivery to end users. Storage 910 includes a central repository with devices capable of storing terabytes or petabytes of data and/or includes distributed storage systems (e.g., appliances that mirror or cache content at Internet interconnect locations to provide faster access to the mirrored content within certain regions). Storage 910 is also configured in any other suitable manner.

As shown, storage 910 may store a variety of different items including content 912, user data 914, and/or log data 916. Content 912 includes television shows, movies, video games, user-generated content, and/or any other suitable type or form of content. User data 914 includes personally identifiable information (PII), payment information, preference settings, language and accessibility settings, and/or any other information associated with a particular user or content player. Log data 916 includes viewing history information, network throughput information, and/or any other metrics associated with a user's connection to or interactions with distribution infrastructure 810.

Services 920 includes personalization services 922, transcoding services 924, and/or packaging services 926. Personalization services 922 personalize recommendations, content streams, and/or other aspects of a user's experience with distribution infrastructure 810. Encoding services 924 compress media at different bitrates which, as described in greater detail below, enable real-time switching between different encodings. Packaging services 926 package encoded video before deploying it to a delivery network, such as network 930, for streaming.

Network 930 generally represents any medium or architecture capable of facilitating communication or data transfer. Network 930 facilitates communication or data transfer using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 includes an Internet backbone 932, an internet service provider 934, and/or a local network 936. As discussed in greater detail below, bandwidth limitations and bottlenecks within one or more of these network segments triggers video and/or audio bit rate adjustments.

FIG. 10 is a block diagram of an exemplary implementation of content player 820 of FIG. 8. Content player 820 generally represents any type or form of computing device capable of reading computer-executable instructions. Content player 820 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 includes a communication infrastructure 1002 and a communication interface 1022 coupled to a network connection 1024. Content player 820 also includes a graphics interface 1026 coupled to a graphics device 1028, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 stores and/or loads an operating system 1008 for execution by processor 822. In one example, operating system 1008 includes and/or represents software that manages computer hardware and software resources and/or provides common services to computer programs and/or applications on content player 820.

Operating system 1008 performs various system management functions, such as managing hardware components (e.g., graphics interface 1026, audio interface 1030, input interface 1034, and/or storage interface 1038). Operating system 1008 also provides process and memory management models for playback application 1010. The modules of playback application 1010 includes, for example, a content buffer 1012, an audio decoder 1018, and a video decoder 1020.

Playback application 1010 is configured to retrieve digital content via communication interface 1022 and play the digital content through graphics interface 1026. Graphics interface 1026 is configured to transmit a rendered video signal to graphics device 1028. In normal operation, playback application 1010 receives a request from a user to play a specific title or specific content. Playback application 1010 then identifies one or more encoded video and audio streams associated with the requested title. After playback application 1010 has located the encoded streams associated with the requested title, playback application 1010 downloads sequence header indices associated with each encoded stream associated with the requested title from distribution infrastructure 810. A sequence header index associated with encoded content includes information related to the encoded sequence of data included in the encoded content.

In one embodiment, playback application 1010 begins downloading the content associated with the requested title by downloading sequence data encoded to the lowest audio and/or video playback bitrates to minimize startup time for playback. The requested digital content file is then downloaded into content buffer 1012, which is configured to serve as a first-in, first-out queue. In one embodiment, each unit of downloaded data includes a unit of video data or a unit of audio data. As units of video data associated with the requested digital content file are downloaded to the content player 820, the units of video data are pushed into the content buffer 1012. Similarly, as units of audio data associated with the requested digital content file are downloaded to the content player 820, the units of audio data are pushed into the content buffer 1012. In one embodiment, the units of video data are stored in video buffer 1016 within content buffer 1012 and the units of audio data are stored in audio buffer 1014 of content buffer 1012.

A video decoder 1020 reads units of video data from video buffer 1016 and outputs the units of video data in a sequence of video frames corresponding in duration to the fixed span of playback time. Reading a unit of video data from video buffer 1016 effectively de-queues the unit of video data from video buffer 1016. The sequence of video frames is then rendered by graphics interface 1026 and transmitted to graphics device 1028 to be displayed to a user.

An audio decoder 1018 reads units of audio data from audio buffer 1014 and output the units of audio data as a sequence of audio samples, generally synchronized in time with a sequence of decoded video frames. In one embodiment, the sequence of audio samples is transmitted to audio interface 1030, which converts the sequence of audio samples into an electrical audio signal. The electrical audio signal is then transmitted to a speaker of audio device 1032, which, in response, generates an acoustic output.

In situations where the bandwidth of distribution infrastructure 810 is limited and/or variable, playback application 1010 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1026 is configured to generate frames of video data and transmit the frames of video data to graphics device 1028. In one embodiment, graphics interface 1026 is included as part of an integrated circuit, along with processor 822. Alternatively, graphics interface 1026 is configured as a hardware accelerator that is distinct from (i.e., is not integrated within) a chipset that includes processor 822.

Graphics interface 1026 generally represents any type or form of device configured to forward images for display on graphics device 1028. For example, graphics device 1028 is fabricated using liquid crystal display (LCD) technology, cathode-ray technology, and light-emitting diode (LED) display technology (either organic or inorganic). In some embodiments, graphics device 1028 also includes a virtual reality display and/or an augmented reality display. Graphics device 1028 includes any technically feasible means for generating an image for display. In other words, graphics device 1028 generally represents any type or form of device capable of visually displaying information forwarded by graphics interface 1026.

As illustrated in FIG. 10, content player 820 also includes at least one input device 1036 coupled to communication infrastructure 1002 via input interface 1034. Input device 1036 generally represents any type or form of computing device capable of providing input, either computer or human generated, to content player 820. Examples of input device 1036 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 820 also includes a storage device 1040 coupled to communication infrastructure 1002 via a storage interface 1038. Storage device 1040 generally represents any type or form of storage device or medium capable of storing data and/or other computer-readable instructions. For example, storage device 1040 is a magnetic disk drive, a solid-state drive, an optical disk drive, a flash drive, or the like. Storage interface 1038 generally represents any type or form of interface or device for transferring data between storage device 1040 and other components of content player 820.

Many other devices or subsystems are included in or connected to content player 820. Conversely, one or more of the components and devices illustrated in FIG. 10 need not be present to practice the embodiments described and/or illustrated herein. The devices and subsystems referenced above are also interconnected in different ways from that shown in FIG. 10. Content player 820 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 820. All or a portion of the computer program stored on the computer-readable medium is then stored in memory 824 and/or storage device 1040. When executed by processor 822, a computer program loaded into memory 824 causes processor 822 to perform and/or be a means for performing the functions of one or more of the example embodiments described and/or illustrated herein. Additionally or alternatively, one or more of the example embodiments described and/or illustrated herein are implemented in firmware and/or hardware. For example, content player 820 is configured as an Application Specific Integrated Circuit (ASIC) adapted to implement one or more of the example embodiments disclosed herein.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

EXAMPLE EMBODIMENTS

Example 1: A computer-implemented method comprising: accessing a video frame that includes a plurality of pixels, computing a local distribution for a specified region of the video frame that includes one or more pixels that are likely to include banding artifacts, the computing including: defining a probability range for the local distribution that lies within a predefined interval, using the defined probability range, generating a cumulative vector that includes a distribution of pixels values along a cumulative range of pixels that lie within the specified region of the video frame, and selecting a pseudorandom value within the cumulative range, and applying dithering at least to the specified region of the video frame using the selected pseudorandom values within the cumulative range.

Example 2. The computer-implemented method of Example 1, wherein the pseudorandom value is generated for selection without implementing a division operation.

Example 3. The computer-implemented method of Example 1 or Example 2, wherein the predefined interval for the probability range comprises a value that is a power of two.

Example 4. The computer-implemented method of any of Examples 1-3, wherein the predefined interval for the probability range comprises a value equal to 256, such that the probability range includes values ranging from 0-255.

Example 5. The computer-implemented method of any of Examples 1-4, wherein the cumulative vector ranges from a variable minimum value to a maximum cumulative value.

Example 6. The computer-implemented method of any of Examples 1-5, further comprising applying an offset value when selecting the pseudorandom value within the cumulative range.

Example 7. The computer-implemented method of any of Examples 1-6, further comprising determining in which portion of the cumulative range of pixels the selected pseudorandom value lies.

Example 8. The computer-implemented method of any of Examples 1-7, wherein at least a portion of the specified region of the video frame is sampled for pixel values.

Example 9. The computer-implemented method of any of Examples 1-8, wherein pixel blocks of a specified size are sampled within the specified region of the video frame.

Example 10. The computer-implemented method of any of Examples 1-9, wherein pixels outside of the pixel blocks remain unsampled, such that line buffers used to store pixel values are reduced in size.

Example 11. The computer-implemented method of any of Examples 1-10, wherein the dithering is applied in a region of the video frame that includes one or more flat color areas.

Example 12. The computer-implemented method of any of Examples 1-11, wherein noise applied as part of the dithering includes one or more pre-computed values.

Example 13. The computer implemented method of any of claims 1-12, wherein the encoder determines, for each region, whether to apply the pre-computed noise values during dithering.

Example 14. A system comprising at least one physical processor and physical memory comprising computer-executable instructions that, when executed by the physical processor, cause the physical processor to: access a video frame that includes a plurality of pixels, compute a local distribution for a specified region of the video frame that includes one or more pixels that are likely to include banding artifacts, the computing including: defining a probability range for the local distribution that lies within a predefined interval, using the defined probability range, generating a cumulative vector that includes a distribution of pixels values along a cumulative range of pixels that lie within the specified region of the video frame, and selecting a pseudorandom value within the cumulative range, and apply dithering at least to the specified region of the video frame using the selected pseudorandom values within the cumulative range.

Example 15. The system of Example 14, further comprising outputting the dithered video frame to an electronic display.

Example 16. The system of Example 14 or Example 15, wherein the video frame is part of a video feed that is streamed to the electronic display.

Example 17. The system of any of Examples 14-16, wherein computing the local distribution for the specified region of the video frame comprises identifying two or more banding artifacts within the region.

Example 18. The system of Examples 14-17, wherein computing the local distribution for the specified region of the video frame comprises identifying one or more local statistics for the region around a specified block of pixels.

Example 19. The system of any of Examples 14-18, wherein applying dithering to the specified region of the video frame includes applying dithering to at least one block of pixels in the video frame.

Example 20. A non-transitory computer-readable medium comprising one or more computer-executable instructions that, when executed by at least one processor of a computing device, cause the computing device to: access a video frame that includes a plurality of pixels, compute a local distribution for a specified region of the video frame that includes one or more pixels that are likely to include banding artifacts, the computing including: defining a probability range for the local distribution that lies within a predefined interval, using the defined probability range, generating a cumulative vector that includes a distribution of pixels values along a cumulative range of pixels that lie within the specified region of the video frame, and selecting a pseudorandom value within the cumulative range, and apply dithering at least to the specified region of the video frame using the selected pseudorandom values within the cumulative range.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing a video frame that includes a plurality of pixels;
    computing a local distribution for a specified region of the video frame that includes one or more pixels that are likely to include banding artifacts, the computing including:
        defining a probability range for the local distribution that lies within a predefined interval;
        using the defined probability range, generating a cumulative vector that includes a distribution of pixels values along a cumulative range of pixels that lie within the specified region of the video frame; and
        selecting a pseudorandom value within the cumulative range; and
    applying dithering at least to the specified region of the video frame using one or more of the selected pseudorandom values within the cumulative range.

2. The computer-implemented method of claim 1, wherein the pseudorandom value is generated for selection without implementing a division operation.

3. The computer-implemented method of claim 1, wherein the predefined interval for the probability range comprises a value that is a power of two.

4. The computer-implemented method of claim 1, wherein the predefined interval for the probability range comprises a value equal to 256, such that the probability range includes values ranging from 0-255.

5. The computer-implemented method of claim 1, wherein the cumulative vector ranges from a variable minimum value to a maximum cumulative value.

6. The computer-implemented method of claim 1, further comprising applying an offset value when selecting the pseudorandom value within the cumulative range.

7. The computer-implemented method of claim 1, further comprising determining in which portion of the cumulative range of pixels the selected pseudorandom value lies.

8. The computer-implemented method of claim 1, wherein at least a portion of the specified region of the video frame is sampled for pixel values.

9. The computer-implemented method of claim 8, wherein pixel blocks of a specified size are sampled within the specified region of the video frame.

10. The computer-implemented method of claim 9, wherein pixels outside of the pixel blocks remain unsampled, such that line buffers used to store pixel values are reduced in size.

11. The computer-implemented method of claim 1, wherein the dithering is applied in a region of the video frame that includes one or more flat color areas.

12. The computer-implemented method of claim 11, wherein noise applied as part of the dithering includes one or more pre-computed values.

13. The computer-implemented method of claim 12, wherein an encoder determines, for each region, whether to apply the pre-computed noise values during dithering.

14. A system comprising:
at least one physical processor;
an electronic display; and
physical memory comprising computer-executable instructions that, when executed by the physical processor, cause the physical processor to:
   access a video frame that includes a plurality of pixels;
   compute a local distribution for a specified region of the video frame that includes one or more pixels that are likely to include banding artifacts, the computing including:
      defining a probability range for the local distribution that lies within a predefined interval;
      using the defined probability range, generating a cumulative vector that includes a distribution of pixels values along a cumulative range of pixels that lie within the specified region of the video frame; and
      selecting a pseudorandom value within the cumulative range; and
   apply dithering at least to the specified region of the video frame using one or more of the selected pseudorandom values within the cumulative range.

15. The system of claim 14, further comprising outputting the dithered video frame to an electronic display.

16. The system of claim 15, wherein the video frame is part of a video feed that is streamed to the electronic display.

17. The system of claim 14, wherein computing the local distribution for the specified region of the video frame comprises identifying two or more banding artifacts within the region.

18. The system of claim 14, wherein computing the local distribution for the specified region of the video frame comprises identifying one or more local statistics for the region around a specified block of pixels.

19. The system of claim 18, wherein applying dithering to the specified region of the video frame includes applying dithering to at least one block of pixels in the video frame.

20. A non-transitory computer-readable medium comprising one or more computer-executable instructions that, when executed by at least one processor of a computing device, cause the computing device to:
   access a video frame that includes a plurality of pixels;
   compute a local distribution for a specified region of the video frame that includes one or more pixels that are likely to include banding artifacts, the computing including:
      defining a probability range for the local distribution that lies within a predefined interval;
      using the defined probability range, generating a cumulative vector that includes a distribution of pixels values along a cumulative range of pixels that lie within the specified region of the video frame; and
      selecting a pseudorandom value within the cumulative range; and
   apply dithering at least to the specified region of the video frame using one or more of the selected pseudorandom values within the cumulative range.

* * * * *